April 21, 1936.  E. DANNER  2,037,853

METHOD OF WORKING GLASS AND ARTICLES PRODUCED THEREBY

Filed Feb. 9, 1933  10 Sheets—Sheet 1

April 21, 1936. E. DANNER 2,037,853
METHOD OF WORKING GLASS AND ARTICLES PRODUCED THEREBY
Filed Feb. 9, 1933 10 Sheets-Sheet 2

April 21, 1936. E. DANNER 2,037,853
METHOD OF WORKING GLASS AND ARTICLES PRODUCED THEREBY
Filed Feb. 9, 1933 10 Sheets-Sheet 3

Inventor
Edward Danner
By Faust F. Crampton
Attorney

April 21, 1936.  E. DANNER  2,037,853
METHOD OF WORKING GLASS AND ARTICLES PRODUCED THEREBY
Filed Feb. 9, 1933  10 Sheets—Sheet 10

Inventor
Edward Danner

Patented Apr. 21, 1936

2,037,853

UNITED STATES PATENT OFFICE 2,037,853

METHOD OF WORKING GLASS AND ARTICLES PRODUCED THEREBY

Edward Danner, Newark, Ohio

Application February 9, 1933, Serial No. 656,687

17 Claims. (Cl. 49—82)

My invention has for its object to provide a method for manipulating glass having relative rigidity of form to enable substantially accurate progressive disposition of portions, heated to produce integration either with previously deposited portions or with an article of manufacture formed of a material to which glass is adherable, the relative rigidity of the glass previous to its application being such as to enable control both as to directing the glass and accurate disposition.

The invention provides a method for using glass preferably in forms having small cross sectional areas wherein glass articles may be shaped on molds or cores that are so formed or treated as to prevent adherence of the glass to the molds or cores, such as by the use of graphite, but wherein progressive integration of the deposited glass is produced. Separate portions of glass, that may, if desired, have different colors, may be intermingled or deposited sequentially, coincidentally or contiguously.

The invention provides a method for working glass whereby the glass is supported in predetermined form and maintained at a fused heat as it is applied to an article or is formed into an article. Thus my invention provides an exceedingly efficient method of producing glass articles or decorating articles to which glass is adherable upon fusion, since it enables accurately controlled application of the glass in its manipulation to produce either articles of glass of any desired thickness or glass decorations of any desired depth and contour.

The invention thus may be used for applying glass parts threaded onto wire, or wire reinforced molten glass, that have substantial rigidity that gives the glass a directive quality and enables accurate manipulation. The glass may be fused progressively and applied to previously shaped or deposited portions of glass. Thus, the invention may be used for applying glass to articles composed of any materials to which glass, when fused, is adherable, such as china, clay, and steel. I have found by using reinforcing wire that fused glass may be applied to various materials besides those named above, since the wire operates to bind and prevent spawling and operates to maintain the applied glass intact and retain it in its position. Thus, the invention provides a method and means for working glass whereby glass may be fused to a wire and fixedly applied while in a cohesive state to an article or formed into a glass article.

Thus, my invention comprehends the working of glass preferably formed to have small cross sectional areas and rendered directive in its application by means of wire extending therethrough when the glass is in a molten or fused state or when in the form of beads or bugles or tubes of various lengths. When used in bar form, such as solid bars or tubes, and when reinforced by use of wire, the solid glass is progressively advanced by pressure or by drawing the wire and fused immediately in advance of its application to articles of commerce or is shaped by the use of articles, such as cores or molds or patterns, into glass articles. The wire operates to direct and maintain continuity of movement of the glass to the point of application, preferably by a drawing of the wire, which draws, directs, and feeds the glass to the article or the form used in shaping the glass into an article. When molten glass is deposited on the wire the wire operates to maintain the continuity of the stream and aids in forming the size of the stream and the application to articles or in building or shaping articles uniformly to produce articles having desired cross sectional areas and dimension. Where the wire is used, the glass that is either deposited on articles, or is used to form articles, is reinforced when the glass solidifies, and consequently the article to which it is applied, or into which it is formed, is reinforced by the wire.

In the conduct of the method involving the use of my invention I have found it preferable to use wire having a relatively high fusion point, and one having a suitable tensile strength. The tensile strength should preferably vary according to the use to which the article formed, or to which the glass is applied, is to be put or according to the thickness of glass deposited. Where the quantity of the glass deposited on the wire is relatively large in cross sectional area, the larger wire is preferable to provide the desired tensile strength both in its application and to withstand the strains that often are produced during the cooling of the glass. Where glass having small cross sectional area is applied, a smaller wire is preferred by reason of the difference in the coefficient of expansion of the wire and the glass that might otherwise cause spawling of the glass owing to the fact that the glass may have a lesser tensile strength and insufficient to withstand the strains that would be set up by reason of the difference in contraction of the larger wire and the relatively smaller quantity of glass.

The invention also provides for the use of one or more wires for the simultaneous manipulation and application of the corresponding number of glass streams or lines, or two or more wires may be used in applying glass in ribbon form and forming a glass web between adjacently located wires and applied in such form to an article, or shaped into a glass article on a core while fused.

In depositing molten glass on wire, the wire may be passed either up through the glass mass or downward through the molten glass and in desired quantities per unit of length of the wire. The wire affords a reinforcement of the molten glass stream that may be as small or fine as desired and enables accurate and easy manipulation of the glass stream in a manner that otherwise would be impossible because of its lack of the required tenacity as between portions of molten glass. The wire enables manipulation of the glass by relatively unskilled users since the glass will follow with accuracy the manipulation of the wire.

The glass that is worked or manipulated may be shaped to have a predetermined form either by drawing the wire through an opening having a particular shape to either form it cylindrically or in ribbon form or other cross-sectional shape. Also, bugles, beads, or tubing may be threaded upon the wire, which gives the glass a predetermined form in advance of its being worked to either form articles or decorate articles. To manipulate the glass, it is directed to a support to which the glass may or may not be adherable, the support cooperating to shape the glass as it is being deposited and while the undeposited glass and the support are moved relative to each other. Thus, the glass in the form of a strand, that is, in the form of a strip, or ribbon, or thread, or string, or stream having a small cross-sectional area, is located on wire and deposited on a suitable support. Where the strand of glass is deposited on an article or a support that is adherable to glass, or where the strand is so deposited as to cause portions of the strand to be placed in contacting relation with respect to previously deposited portions of the same strand, there is produced a cross-wise bonding of portions or turns of the strand to rigidly maintain the said portions in their positions in which they were deposited.

The invention also provides apparatus for carrying out the method referred to above and comprises primarily a means for heating glass and directing it to points of application while controlled as to its amount and its rate of application and manipulation of the article or mold by which the glass is shaped. The apparatus in which the method may be conducted may partake of different forms.

Other features and advantages of my invention will be apparent upon examination of the drawings filed in connection herewith and the description of the invention hereinafter set forth. The method may be greatly modified as to the steps in the operation. To illustrate a practical application of the invention, I have selected three distinct forms of the apparatus as illustrative of the various embodiments and uses of the invention and shall describe the selected apparatus and method hereinafter. The apparatus selected for purposes of illustration are shown in the accompanying drawings.

Figs. 4, 5, 6, and 7 illustrate the glass assembled in various forms preparatory to its application. Fig. 15 is a view of a section taken on the plane of the line 15—15 indicated in Fig. 14. Fig. 16 is a view of a section taken on the plane of the line 16—16 indicated in Fig. 15. Figs. 14, 15, and 16 illustrate sections of parts of the apparatus illustrated in Fig. 13.

Figures 1, 2, 3:
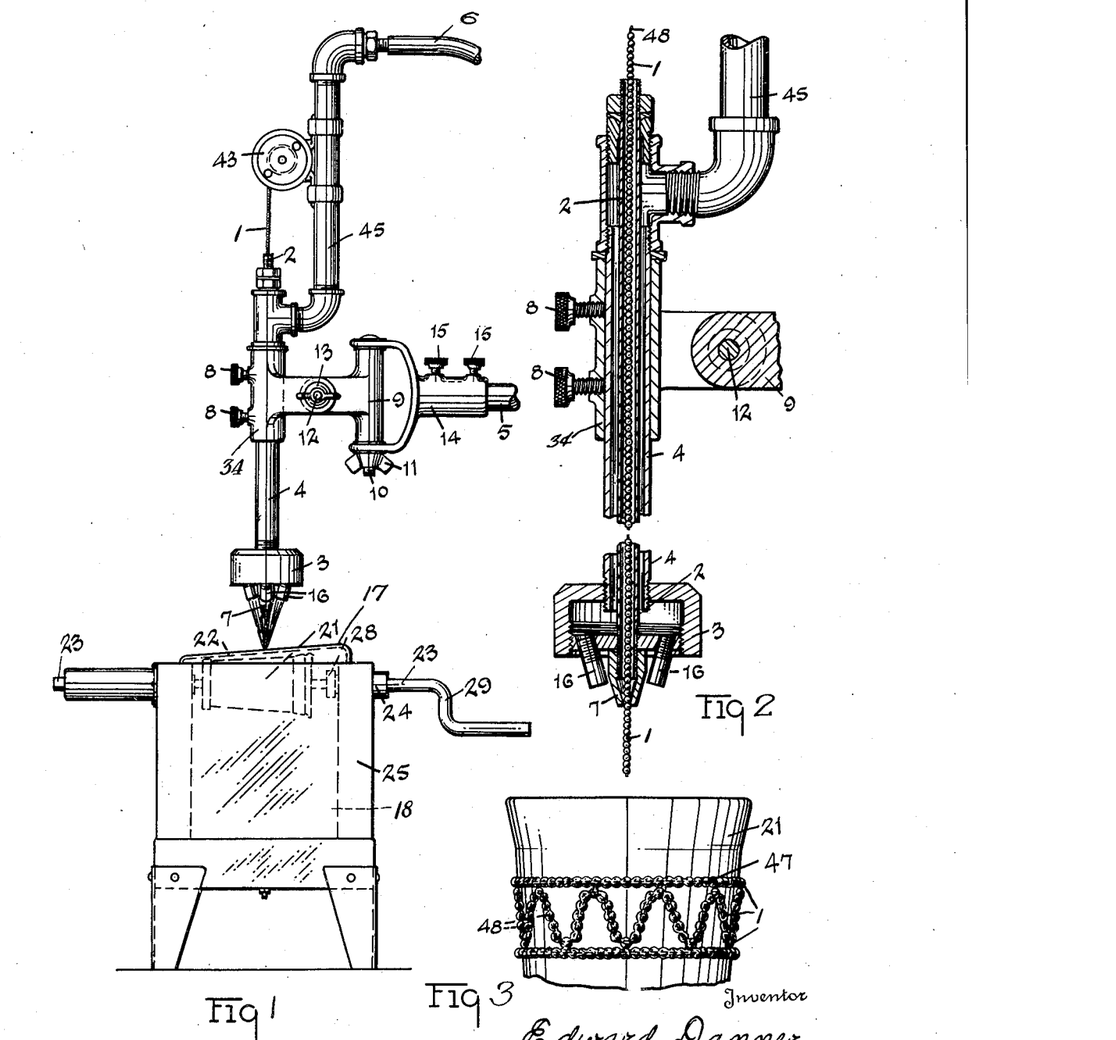
Fig. 1 illustrates a means for manipulating glass bodies and the application of the glass to the bodies.
Fig. 2 is a broken view illustrating a view of a section of the guide and the burner shown in Fig. 1.
Fig. 3 illustrates one of the many results that may be produced by the operation of the apparatus illustrated in Fig. 1.

In the form of apparatus illustrated in Fig. 1, means is provided for fusing subdivided portions of solid glass supported on wire and depositing the fused glass on an article, or shaping the glass into desired forms. The glass in the form of beads, bugles or tubes, is threaded upon a wire in any desired arrangement and is conveyed by the wire through the heater. The glass portions are fused to cause them to coalesce by the heat of the flames and to adhere to an article to which they are directed, or to parts of the glass previously deposited on a core and to which they are drawn by winding of the wire and the glass. Also means are provided for directing glass beads or tubes, having desired lengths, size, shapes and colors, which may be assembled as may be desired for progressively feeding the beads to the point of application of the glass of the beads to the part on, or in which the glass is shaped and wherein means is provided for fusing the glass of the beads as it passes to, or through, a point located in proximity to the point of application of the glass. The glass beads are located in a tubular member, such as the tube 2, which extends to a point near the burner. The burner 3 is supported on the shell 4 that may be tubular in form and supported by a suitable bracket 5. The upper end of the shell 4 may be connected to the source of supply of fuel gas and air by means of the tube 6.

The burner and the guide are preferably supported for ready adjustment and location with reference to the article, or forming body, to which the glass beads are directed. The bracket 5 may be pivotally supported for swinging movements to enable ready adjustment of the burner with reference to the article to which the glass is to be applied. In the particular form of construction shown, the bracket 5 is provided with thumb screws 8 for securing the shell 4 at the desired height with reference to the article to which the glass of the beads 1 is to be applied. Further, ready adjustment is provided by means of jointed parts of the bracket 5. Thus the shell 4 and the part 34 may be swiveled on the bolt 12 and secured in position by the thumb nut 13, and the part 9 may be swiveled on the part 14 by means of the bolt 10 and secured by the thumb nut 11, and the part 14 may be adjustably secured to the bracket 5 by the thumb screws 15.

The burner 3 is provided with a plurality of jets 16 that direct flames in directions that are inclined to each other and so as to focus the flames and produce the higher temperatures at the point of intersection of their directional lines and within the line of direction of the movement of the beads 1 and near the article, or core. The glass is then fused, and the article, or core, in the vicinity of the point of immediate application, is heated by the flames. As the glass is fused, it is applied to the article and caused by reason of its fusion to adhere either to the article or to portions of the material that may have been previously deposited upon the mold or shaping body. The guiding tube 2 terminates in a nozzle 7 that extends to near the focusing point of the flames and thus locates the yieldable glass near the part to which the glass is applied.

The article or core, depending upon whether the glass is to be applied to an article or is to be shaped into an article, is supported in a chamber 18 having walls that surround the article or core to prevent too rapid chilling of the glass. As shown in the drawings, the article, or core, 21 is supported between two end plates or blocks 19 and 20. The blocks may be shaped to fit the interior of the article where the glass is to be added to the material of the article, and the block 20 is shaped to the bottom of the article and the blocks 19 and 20 may be spring pressed towards each other to yieldingly clamp the article 21 between the blocks. Where a core is used for shaping the glass the core is preferably formed of graphite, or graphite compound, or is provided with an exterior graphite coating and the shafts are suitably secured to the core. While a tumbler or frustum shaped body is shown for purposes of illustration, yet it is understood that the glass may be applied to any shaped article or any shaped core or forming body, and means suitable to the shape of the article or core or mold is used for connecting it to its actuating means. Preferably, the blocks are supported on rods or shafts 23 that are rotatably supported in suitable bearings 24 located in the walls 25 of the chamber 18. Preferably, the rods or shafts 23 are freely longitudinally movable in the bearings 24 to permit axial, as well as rotative, movement of the article 21 to locate it as may be desired with reference to the fused portion of the glass beads 1 as it is heated by the flames that are directed towards the glass and the article 21 by the jets 16.

Combinations of axial and rotative movements of the article 21 produce desired relatively inclined, or curvilinear, striations of the glass of the beads that is progressively deposited as contiguous portions thereof are fused. The relative movement between the beads 1 or nozzle 7 and the article 21 may be obtained in a great variety of ways, such as by movement of the article relative to the burner, or by movement of the part supporting the article 21 and rotation of the article, or movement of the burner 3, together with the beads 1, relative to the article while the work progresses.

In the form of construction shown, a spring 27 operates to elastically press the block 19 against the article 21, and the block 20 may be normally held in position by means of the ring 28, which is connected to the shaft 23 and engages a side wall 25 of the chamber 18. The axial movement of the article 21 may be produced by the hand of the operator located on the crank 29 which may be pressed axially to shift the article 21 against the pressure of the spring 27, as well as to rotate the article 21 to dispose the fused glass as may be desired.

As is well known in the glass working art, it is often desirable to anneal or temper shaped glass to eliminate internal strains that may, upon slight jar of the glass, cause the glass to crack. In most cases where the shapes are irregular in form, annealing is required, since unequal cooling causes strains as between the thicker and more massive portions and the thinner or smaller portions. Where, however, the cross sectional areas throughout the article are uniform, as where the areas are relatively small, uniform chilling occurs and consequently no unusual strains are set up, and consequently annealing is not so essential. The glass applied or integrated into a formed article by my process is preferably annealed to prevent possible separation of the glass. When wire supported glass is used, the wire operates to counteract cracking and spawling that may be caused by irregular cooling to some degree, yet annealing quite entirely eliminates strains and stresses that invariably occur in the glass manipulation and is often desirable even through the glass is reinforced by wire.

The chamber 18 may be covered by a suitable cover 17 to quite completely enclose and cover the article 21 and thus prevent rapid chilling of the deposited, or applied, glass on the article 21, and also prevent excessive heat reaching the burner, which interferes with its operation, and the upward convected currents prevent focusing. Preferably, a slot 22 is formed in the cover 17 to enable the deposition of the fused glass that is produced by heating contiguous portions of the wired glass.

Figures 9, 10, 11, 12:
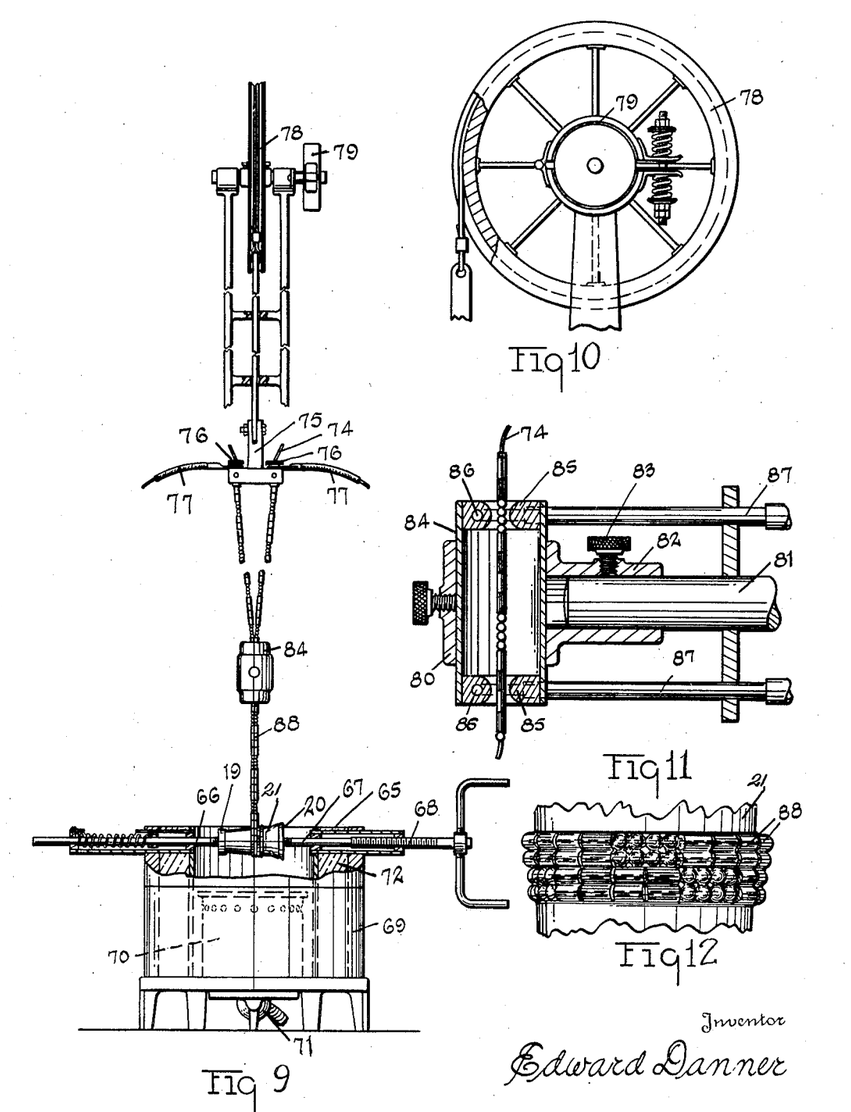
Fig. 9 illustrates a further modified form of apparatus for the working of glass.
Fig. 10 illustrates a reel for feeding glass.
Fig. 11 illustrates a guide for directing glass.
Fig. 12 illustrates glass applied to an article for decorative purposes.

The glass and wire are supported on the reel 43. The reel is rotatively supported on the pipe 45. The wire and the beads threaded thereon are drawn through the tube 2 as the article 21 is rotated. As the beads move toward the article, they are heated and finally fused by the flames projecting from the burners 16 to which gases are directed through the flexible pipe 6 and the pipe 45.

Thus beads are fused and readily applied to the article 21 and as the article is shifted or rotated, the glass assembled on the wire will, together with the wire, be drawn along the paths that are formed according to the axial or rotative movements produced by the operation of the crank 29. By integration of the adjoining glass portions there will be produced a bead-like ridge, when the glass is applied to an article, such as shown at 1 in Fig. 3, or there will be bead-like assembly, if the glass is formed into a glass article, and, whether an application of glass is produced for decoration purposes or for the formation of glass articles, the wire will operate to reinforce and bind the glass.

The wire 48 used for supporting the glass beads 1 is, preferably, a nichrome wire because of its high melting point and because of its high tensile strength at a high temperature. Different sized wires may be used according to the size of the beads or other glass articles, such as bugles or tubes, supported by the wire. The wire operates to directively feed the glass to the article or to the core. It also enables uniform distribution and accuracy of deposition inasmuch as the movement of the glass is yieldingly resisted as it is drawn from the reel 43 by rotation of the form. The glass may thus be definitely located according to the manipulation of the crank 29. Also where glass and wire are used to form glass articles, and applies the glass to articles, the wire operates to bind the glass.

Figures 4, 5:
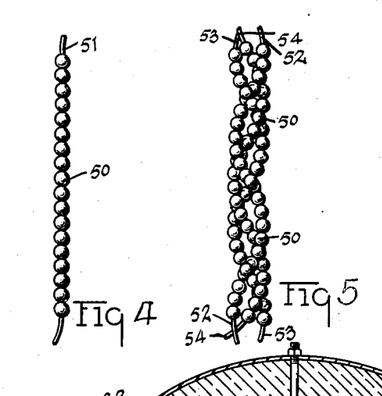
Fig. 4 illustrates a plurality of beads threaded on the wire that directs the glass to the article.
Fig. 5 illustrates a plurality of wires, each of which is provided with beads of similar or different colors to produce the desired tints or shades or colors.

The wire-supported glass may partake of many forms. A plurality of wires may be used together in making the striations or in forming articles. In Fig. 4 is shown glass in the form of beads 50 supported on a wire 51. The beads may be of the same color or may be formed of various colors; they may be varied in size and in shape in order to produce the desired decorative effects in the formation of the ridges 47 or in an article when the glass of the beads is fused into a complete integrated article shape.

In the form of assembly shown in Fig. 5, beads 50 are supported on a plurality of wires 52, 53, and 54, and the wires may be twisted or braided to form a rope-like appearance. The ridges or integrated assembly produced by the fused beads will quite accurately correspond to the braid or rope into which the wires having the beads are formed in advance of their deposition. The effect will be pronounced if the beads on each wire have a color distinctive from that of the beads on the other wires.

Figures 6, 7:
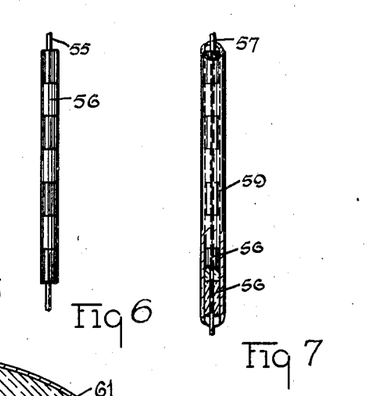
Fig. 6 illustrates a plurality of bugles assembled for application to the body on a wire.
Fig. 7 illustrates a further variation of the assembled glass in which the beads or bugles or tubes of any length may be used and located within a glass tube.

In Fig. 6 is shown an illustrative arrangement of bugles 56 supported on the wire 55. The bugles may have similar or different colors and when fused as the glass is applied, will coalesce and integrate, one into the other, to produce striking shades or tints.

In the form of glass assembly shown in Fig. 7, the wire 57 is used for supporting bugles 56 of different colors within tubes 59 which may be of the same or dissimilar colors and causing thereby a corresponding effect in the applique or in the integrated portions when an article is formed therefrom.

Figure 8:
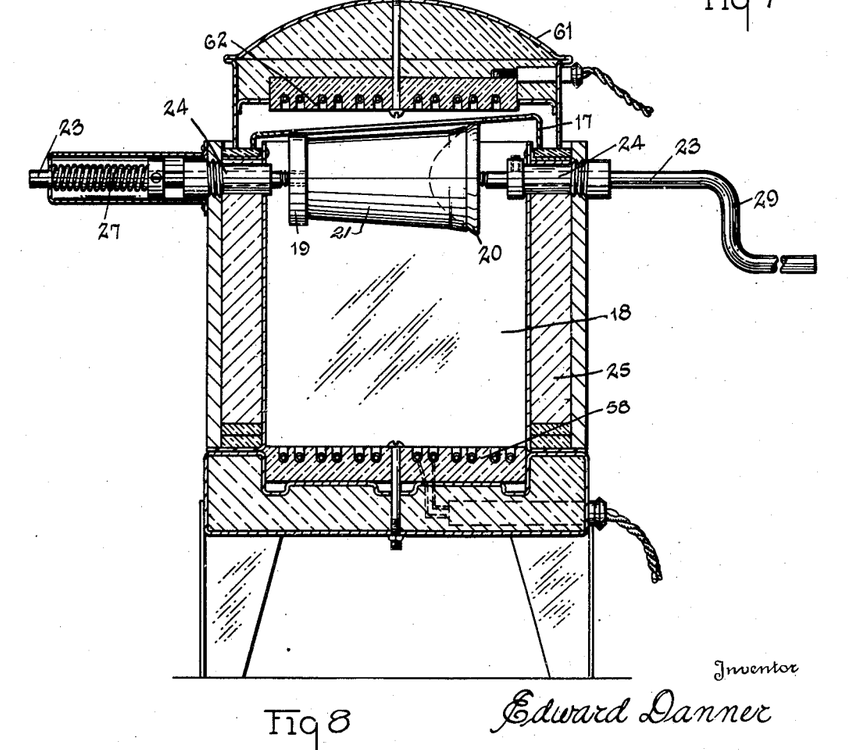
Fig. 8 illustrates a view of the section of the part of the apparatus in which an article or a shaping core may be heated, manipulated, and maintained at a desired temperature.

By my invention I have also provided means for pre-heating the article or the form or core part. In Fig. 8 is shown a working oven wherein the part to which the glass is to be applied may be mounted and pre-heated. The article or core part 21 is clamped by means of the spring 27 between the blocks 19 and 20 and is located in the chamber 18 having heat insulating walls 25. The part is rotatably supported in the bearings 24 and is movable axially and rotatably by the operation of the crank 29 during the application of the glass to the article. Beneath the part 21 is located an electrical heat element 58. This may be located if desired in the bottom of the chamber 18. Above the part 21 is located the slotted plate 17 and a cover 61, preferably formed largely of heat insulating material, is located on the top edge of the wall 25 to completely close the chamber and enclose the part 21. An electric heat unit 62 is mounted in proximity to the part 21. Preparatory to the application of glass to the part 21, the plate 17 is removed, and a current is directed to the heating units 58 and 62 by a suitable switch to produce the desired temperature conditions within the chamber 18 and to raise the temperature of the part 21 to the desired point in advance of the application of the glass in order to insure adhesion or cohesion as the case may be, between the applied glass and the material of which the part is formed, or cohesion of the glass to previously deposited portions. The temperature to which the part 60 is raised will depend upon the character of the material of which the part is formed.

In the form of apparatus illustrated in Fig. 9, an article or core 21, is rotatably mounted in a working section 65 by the shafts 66 and 67. The shaft 66 is spring pressed to clamp the part 21 between the blocks 19 and 20 located on the ends of the shafts 66 and 67. If desired, the shaft 67 may be threaded as at 68. The thread may be formed to have the desired pitch in order to bring about the desired longitudinal or axial displacement of the shafts 66 and 67 and the part 21 to produce the deposition of the glass.

The working section 65 is removably supported on the working oven 69 having a suitable burner 71 and a heat distributing shell 70 and operates to maintain the temperature of the part 21 and prevent rapid chilling of the applied glass. The working section 65 may be one of a number of sections having parts 21 supported therein and which may be stacked as may be desired and raised to a suitable temperature by a heating means in advance of the application of the glass to the parts. The working sections may be removed one by one and placed in position on the oven 69 for the application of the glass and may then be, if desired, subsequently returned to the stack to prevent rapid chilling, or they may be stacked over another heater whereby the glass may be annealed.

The glass in the form of tubes or bugles or beads 88 is threaded onto a nichrome wire 74. The wire 74 is looped, and its ends are connected to a block 75 and through the binding posts 76 and the lead wires 77, and is connected to a source of supply of electric current. By reason of the electrical resistance of the nichrome wire, the wire becomes heated and operates to heat the glass supported on the wire to a fusing temperature. The electric current will pass through one leg of the loop and return through the other leg of the loop and thus complete the circuit.

The block 75 is connected to a suitable reel 78 whose rotation is frictionally resisted by a suitable brake 79. The block 75 and the looper wire are drawn down by the rotation of the article 21, and the glass is applied to the article or core.

A suitable water cooled guide 80 is adjustably supported on the bracket 81 by means of the socket 82 and is secured in position by means of the thumb bolt 83. The guide 80 comprises a shell 84 having, at its upper and lower ends, suitable metal annuli 85 through which the wire 74 and the beads supported thereon are guided. Each annulus 85 is formed hollow, it being provided with the chamber 86 through which water may be directed. Each annulus is connected by means of a pair of pipes 87 for directing water to and from the passageway 86 to chill the guides and prevent adherence of the heated glass produced by the electric current that passes through the wire 74.

The glass when applied by the apparatus illustrated in Fig. 9 will partake of a form similar to that illustrated in Fig. 12 wherein the beads and bugles will produce exceedingly attractive decorative effects, as shown at 88.

In the form of apparatus shown in Figs. 13, 14, 15, and 16, the wire supported glass is progressively raised to a fusing temperature in a tunnel or tower having a plurality of electric heaters. It is formed of a plurality of parts located in sections 90. The sections are so formed that they may be stacked to continuously and increasingly heat the glass as it is conveyed to the articles or cores or forms. The supply of current is conducted to the electric heat element 91 through the line 92 in each case, and may be controlled by suitable electric controllers. The electric heat element 91 is preferably supported on the thin wall tube 93 in each case. The tube 93 is covered with cement and the heat element 91 is imbedded therein. The heat element 91 and the tube 93 are enclosed within a shell 95, and the tube 93 and the shell 95 are sustained in spaced and coaxial relation by means of the rings 94 to form an annular chamber 110. Preferably, an insulating packing material 96 is located in the chamber 110 to heat insulate the heat element 91 from outward radiation. Short sleves 97 are welded to the exterior of each shell 95 preferably at diametrically opposed points. The exterior of the shell 95 is surrounded by suitable heat insulating material 98, such as pipe covering, or the like. The sections are assembled by location of the sleeves 97 in alignment with each other and tied together by means of the tie rods 100 that extend through the sleeves to a supporting frame located above, to which the rods 100 are connected. The tie rods 100 may be threaded into the plate 101 and thus operate to suspend the apparatus from the supporting frame.

Beneath the pre-heating elements is located a working oven or chamber in which an article or core on which the glass is deposited is located and is held in operative position by means of the shafts 102 and 103, one of which, such as the shaft 103, is spring pressed towards the shaft 102 to yieldingly clamp the article or core and provide for axial and rotative movement of the article or core by the operation of the crank 104. Preferably the heated glass is guided by means of the wire 105 and a water cooled guide 106. Suitable pipes 99 are connected to the guide and to a source of supply of water for maintaining the guide chilled and prevent adhesion of the hot glass to the guide. The water cooled guides 106 may be disposed at desired points within the stack to maintain the heated glass supported on the wire 105 in position and prevent contact of the glass with the hot walls of the furnace.

The working oven may be provided with suitable heat coils 107 and 108 that are connected to a source of supply of electric current through the wires 109. Preferably, the oven is formed of hingedly connected parts 115 and 116 by means of the hinges 117. The lower part may be closed against the upper part and locked in that position by the latch 118. The part 115 is bolted to the plate 101 by means of the bolts 119, and consequently the part 115 is suspended by means of the tie rods 100. The part 116 may be unlatched and allowed to swing downward away from the suspended part 115 for the purpose of insertion or removal of the article or core.

The article or core is supported between the shafts 102 and 103 that are in turn supported on the brackets 122. If desired, the outer ends of the brackets 122 may be provided with recesses or notches 123 in which the ends of the shafts 102 and 103 may be located. Also, the shafts may be supported between edges of the inner and outer shells 124 and 125 of the work oven. The shafts 102 and 103 may be secured in their positions for longitudinal and rotative movements by the closing of the part 116 of the oven. They are slidably operated and rotated by means of the crank 104.

The wall of the working oven, between the inner and outer shells 124 and 125 is packed by suitable asbestos and magnesium compound of a type commonly used for heat insulating ovens and furnaces. The work may be observed through a suitable peek-hole 127 that may be closed by a suitable plug 128.

Figures 13, 14:
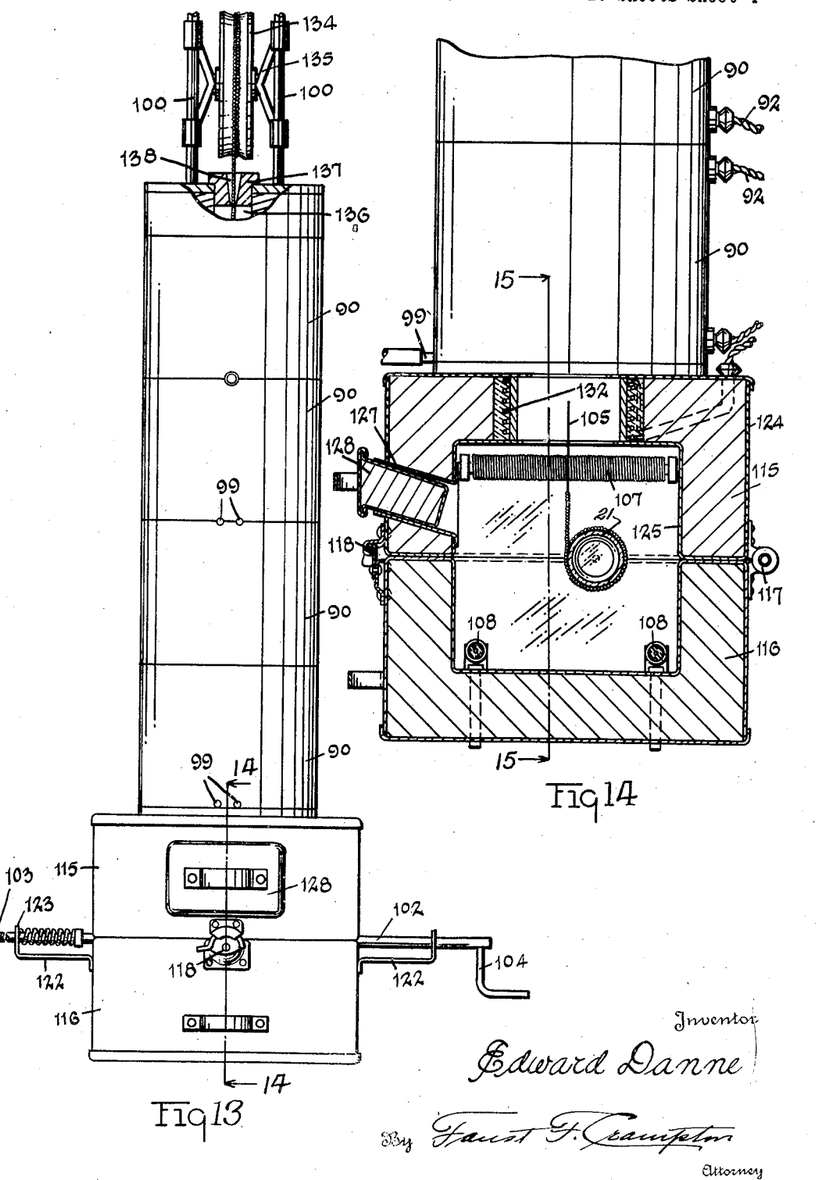
Fig. 13 illustrates a modified form of glass heater wherein a plurality of heating units are stacked to form a heating tunnel or tower.
Fig. 14 illustrates a view of a section taken on the plane of the line 14—14 indicated in Fig. 13.

Also, if desired, a heater 132, similar in form to the heating units 91 may be supported in the top wall of the work oven for maintaining continuity of the heat operation or to further increase the temperature of the oven at the point of entrance of the glass into the work oven.

The wire 105 is located on a reel 134 that may be supported on the rods 100 by suitable brackets 135. Preferably, the reel 134 is supported on ball bearings, and a brake affording a light frictional resistance to its rotation is provided to properly maintain the desired tension of the wire 105 as the article or core is manipulated by its rotation and longitudinal displacement.

The upper end 136 of the heating chamber formed by the coaxially arranged tubes 93 may be closed by a bushing 137 having an opening 138 that has a diameter at its lower end substantially the same as that of the external diameter of the glass supported on the wire. Preferably, the opening 138 is formed to have a conical surface to reduce friction and center the glass with respect to the tubes 93.

In the modified form of apparatus shown in Figs. 17, 18, 19, and 20, the wire is charged with molten glass which it gathers from a working receptacle into which the glass is directed. The wire thus supports the molten glass that is maintained in its molten condition until it is applied to the article or to the core or other shaping body. The glass may be applied very much more rapidly to the article by gathering molten glass and depositing it on the article or core since the glass is in a molten state and the time required to fuse the solid glass is eliminated.

The apparatus is provided with one or more suitable pots for containing a quantity of molten glass. If desired, the glass batch may be deposited in the pots and melted to produce the glass. Or, if desired, the pots may be filled by glass from a furnace in which the glass is melted and transferred to the pots by ladling. Also, a means is provided for directing the glass from the pots to a suitable working receptacle through which the wire is drawn to gather the glass on the wire.

If desired, a plurality of pots may be used for the purpose of maintaining continuity of supply or for the purpose of feeding to the working receptacle desired quantities of glass of different colors either sequentially or simultaneously for producing different colors or to produce variations or shades of color according to the proportionate quantities of the different colored glass that may be directed into the working receptacle.

As shown in the drawings, the apparatus is supported by suitable frame 142. The pots 143 are located within a suitable furnace having a refractory wall 144 that is secured in position by the frame 142 which may be provided with the usual buck-stays, etc. for strengthening the wall. If desired, the wall may be enclosed within a shell 145 formed of steel plates. The pots 143 are provided with suitable mouths or ports 146 that may be closed by suitable stoppers 147 which, if desired, may be provided with suitable peek holes 148 for the purpose of determining the quantity of the glass within the pot and its condition.

Each pot 143 is provided with an outlet 149 that communicates with a suitable trough 150 that may be formed in the block 151. Preferably, the block 151 is channeled to provide troughs or passageways having inclined bottoms for the delivery of the glass from the pots. The outlet 149 of each pot is controlled by means of refractory clay plug 153 that is supported by a threaded rod 155 and a wheel 156 having a central nut 157 that may be rotated for adjusting the location of the lower end of the plug 153 with reference to the opening 149 to regulate the rate of flow of the glass from the pot 143.

The channels 150 of the block 151 convey the glass from the pots 143 to the receptacle 160. Preferably, the receptacle 160 may be formed of refractory composition and is provided with an opening to permit movement of the gathering wire through the molten glass. Inasmuch as it is difficult to form an opening in the porcelain sufficiently small to prevent escape of glass, a bushing or seal 164, formed of nichrome metal, is located in the bottom of the receptacle 160. The bushing 164 may be drilled to form an opening having a diameter but slightly larger than that of the wire.

The wire is fed up through a plug 166 that may be supported by a suitable forked rod 167 that extends from the exterior of the wall of the furnace. The plug 166 is located in the block 168 on which is positioned a heating element 169, that surrounds the lower end of the working receptacle 160 and the portion of the wire located just below the seal, or bushing, 164. The heating element 169 operates to keep the seal hot, particularly the lower end of the seal, and also to heat the wire 162 in advance of its entrance into the working receptacle 160. The space surrounding the working receptacle and the heaters 161 and 169 and within the working chamber may be filled with heat insulating material 171 to prevent outward radiation and concentrate the heat on the wire and conserve the heat of the glass in the working receptacle.

The wire passes through the glass 170 located in the receptacle and, by reason of the coherence of the glass to the wire, it draws the glass upwardly with the wire. The wire and the glass surrounding the wire may be drawn by rotation of the article or core 21 that may be suitably supported between the shafts 172 and 173 and caused to rotate and shift axially as by a crank in the same manner that the articles or cores 21 are rotated in other forms of apparatus heretofore described. The wire 162 and the glass supported thereon may pass up through a guide 175 which preferably is water cooled by means of water that may be directed to the guide through the pipes 176 from a source of supply of water.

A shell 177 is located around the guide 176 and when the desired amount of glass has been applied to the articles or the molds as in the manner described in connection with the other forms of apparatus, the glass and wire may be clipped off and bent laterally so as to engage the upper edge of the shell 177. In starting again the application of the glass to the form, the bent end of the wire and glass may be drawn up sufficiently so that fresh hot glass may be applied to it and the cold glass and wire above the fresh hot glass may be clipped off and the application started at the point where the glass is hot.

The furnace is heated by one or more burners, such as the burners 180, which direct the fuel to and from a flame in the heating chamber 181. The glass in the pots 143 will thus be heated since their bottoms cover the chamber 181. They are located in the chamber 182.

Also, the working chamber 183 and the drawing chamber 178 of the furnace may be heated by opening the gates 184 and 185, which will cause the chambers to be heated. When it is desired to alter the mechanism of the working chamber for the purpose of varying the method of operation, or for repair of the apparatus in the working chamber 183, the gates 184 and 185 may be closed to enable the working chamber and the apparatus located in the working chamber to cool.

Also, in order to enable threading of the wire 162, the chamber 183 may be provided with an opening 187 that may be closed by a suitable door 188. The door 188 may be counterbalanced by a suitable weight 186 and a cable that passes over a suitable sheave 179. Also, in order to enable removal or replacement of the article or core, the upper end of the chamber 183 may be provided with a cover 190, which may be readily removed. Or, if desired, the article or core may be removed through the opening 192, which is closed by a shell 193 and may be secured in its closed position by means of the sliding bar or door 194 that may be raised or lowered by means of the handle 195.

If desired, the shaft 173 may be provided with thread 196 to move the article or the core axially as it is rotated. The lower edge of the bar 194 may be provided with an arcuate recess 197 having thread that corresponds to the thread of the threaded portion 196. The thread of the recess 197 will cause the shaft 173 to advance according to the pitch of the thread as the shaft is rotated. The pitch of the thread is such as to advance the core or mold according to the helical form that it is desired to apply consecutive turns of the glass on the article or core.

Figure 17:
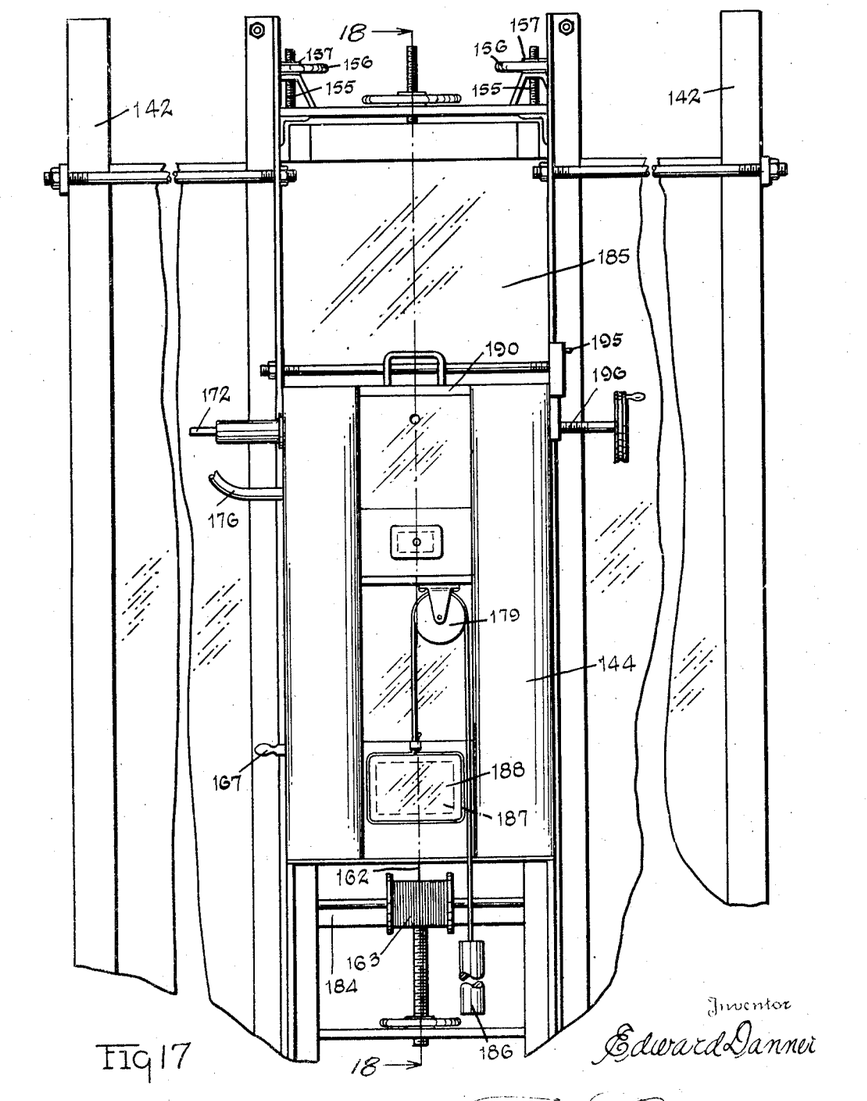
Fig. 17 illustrates a front view of a furnace, shown partially broken, for heating and gathering glass.
Figure 18:
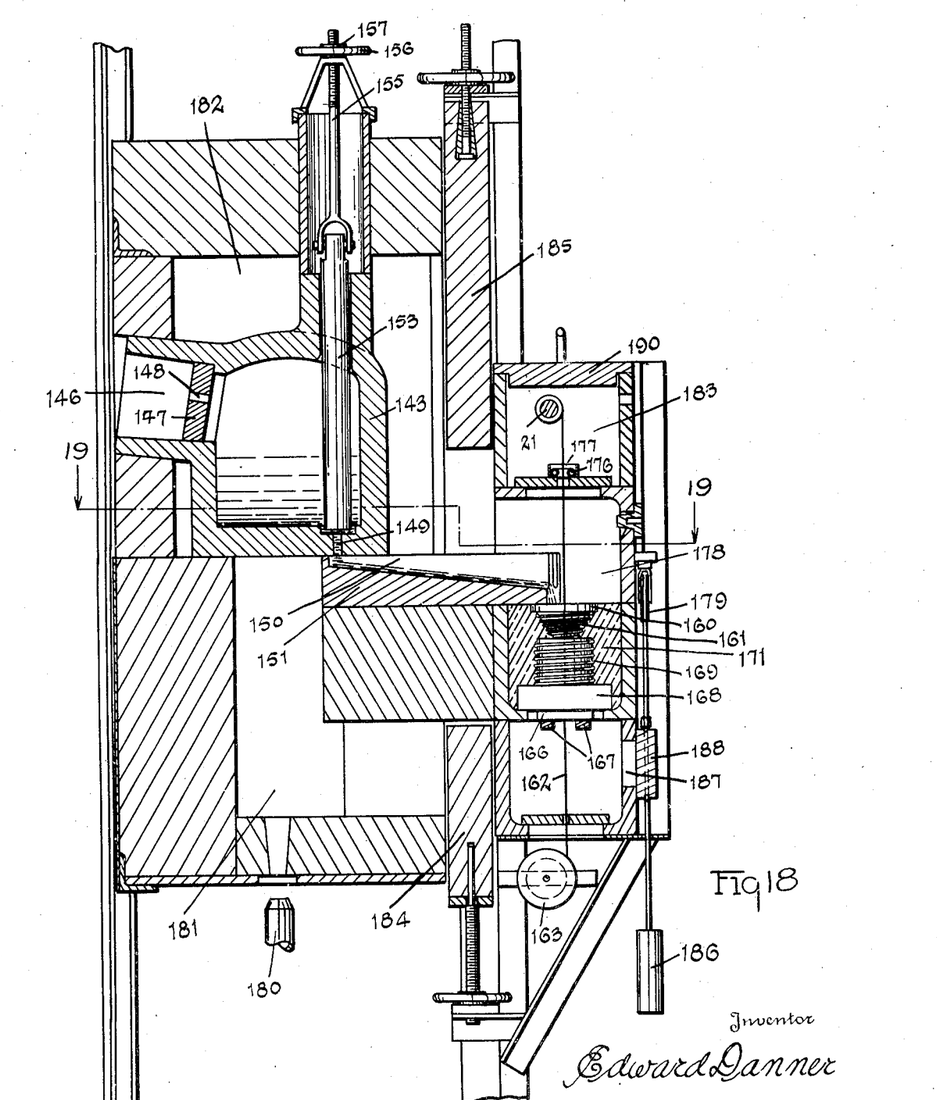
Fig. 18 is a view of a section taken on the plane of the line 18—18 indicated in Fig. 17.
Figure 19:
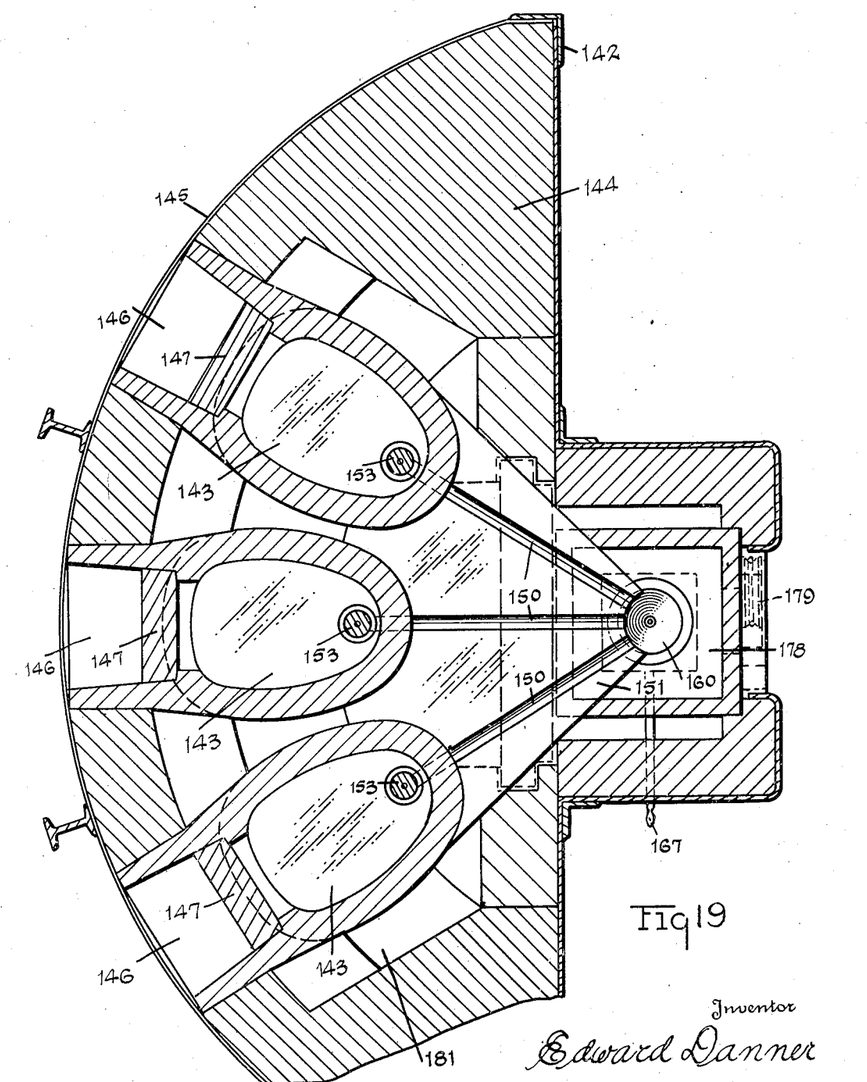
Fig. 19 illustrates a view of a section taken on the plane of the line 19—19 indicated in Fig. 18.
Figure 20:
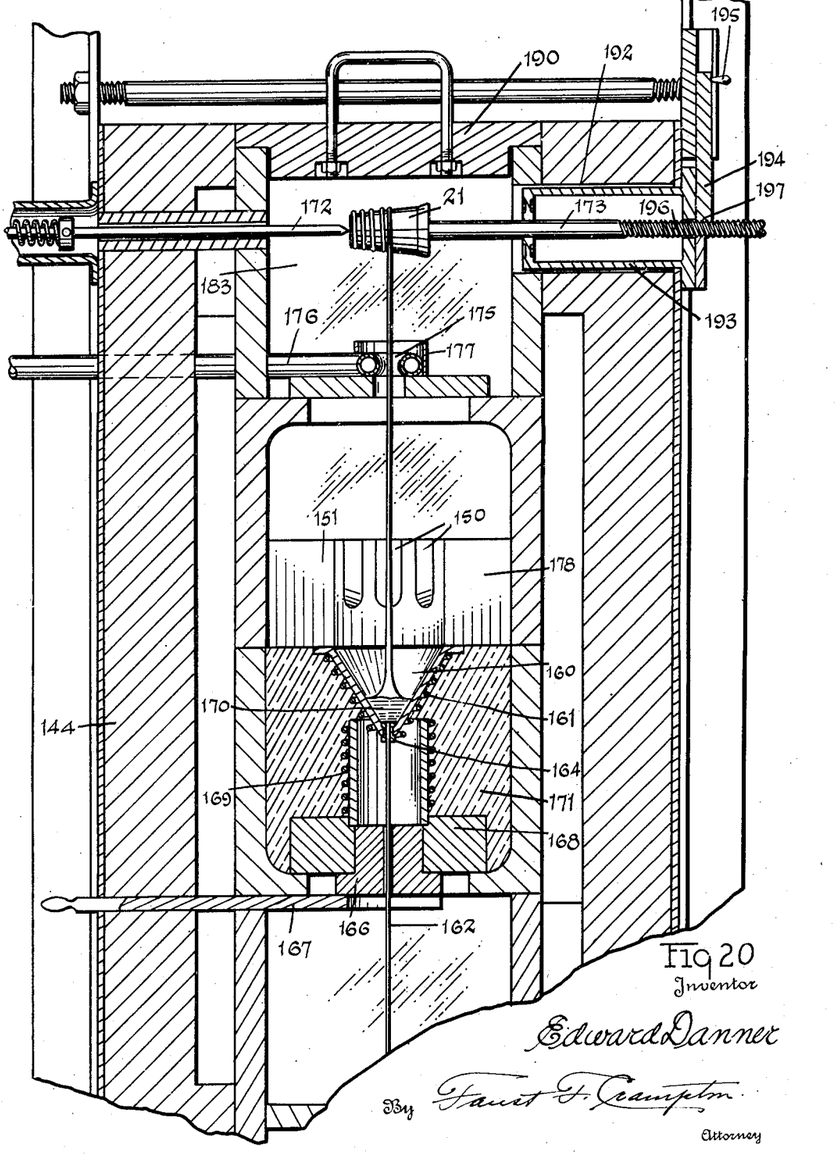
Fig. 20 illustrates a view of a vertical section through the glass working part of the furnace.

The portion of the furnace that encloses or forms the working chamber 183 may be modified to accommodate mechanism for working the glass, such as the working sections 65, shown in Fig. 9, whereby the article or core may be pre-heated in stacks of such sections and placed in position to receive the glass that is drawn from the working receptacle 160 by means of the wire 162 and then may be, subsequently restored to the stack of such sections, or to another stack of sections in which the glass may be annealed.

Figure 21:
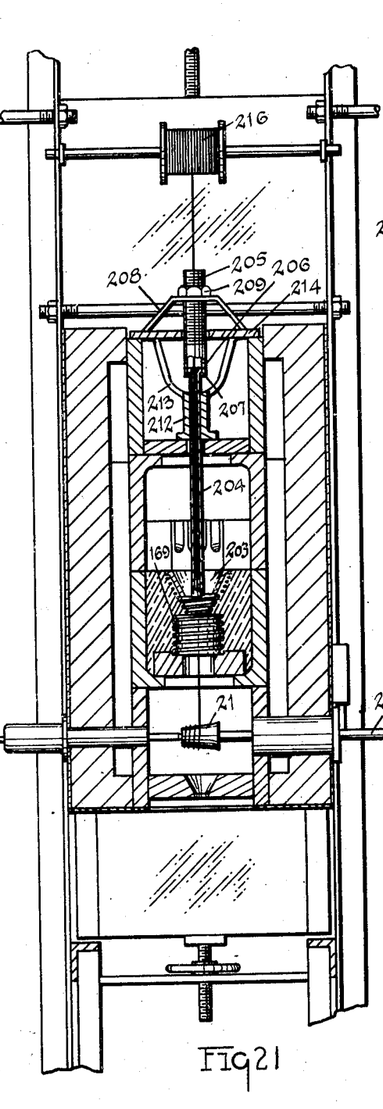
Fig. 21 illustrates a view of a section of a modified form of the glass delivery part of the furnace shown in Figs. 17, 18, and 19.
Figures 23, 24, 25:
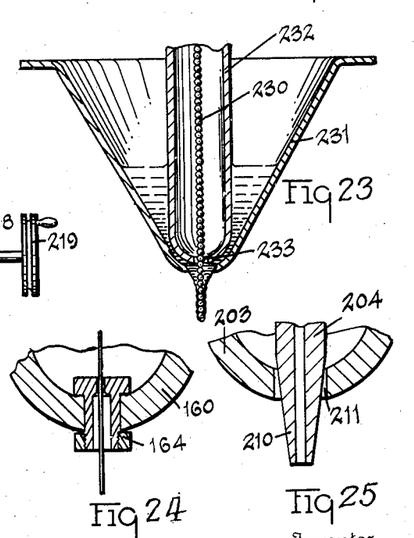
Fig. 23 illustrates a modified form of working receptacle wherein threaded beads may be surrounded with glass to fuse the beads and produce adherence of the glass of the beads and the surrounding glass.
Fig. 24 illustrates a seal to prevent the escape of the glass and permit the movement of the wire into the working receptacle.
Fig. 25 illustrates a flow control for directing glass to a wire.

As a further illustration of the modification of the working part of the apparatus, means may be provided within the working chamber for drawing the wire down through the working receptacle 160 and drawing with it the desired amount of glass as shown in Fig. 21. When the wire is drawn downward through the glass in the glass receptacle and through the bottom of the working receptacle 160, the amount of glass deposited on the wire can be regulated with greater accuracy than when the wire is drawn upward through the glass. This is due to the fact that the wire may be drawn through a refractory tube 204 that may be adjustably supported by means of a threaded sleeve 205 to regulate the glass flow. The tube 204 has a head 206 that is engaged by an inturned flange or lip 207 formed on the lower end of the threaded sleeve 205. The threaded sleeve 205 is supported by a U bracket 208 and a nut 209 that may be rotated and, by reason of the thread on the sleeve 205, may be advanced as may be desired to adjust the height of the tube 204 with reference to the bottom of the working receptacle 203 and, more particularly, with reference to the opening 211 formed in the bottom of the receptacle. The tube 204 has a tapered end 210 that extends into the opening 211 to form an annular outlet for the glass. The glass moves through the opening 211 in quantities dependent upon the location of the tapered end 210 in the opening and also according to the depth of glass in the working receptacle 203 which is controlled by the amount of the glass that is allowed to flow into the receptacle through the outlet ports 149 as controlled by the plugs 153.

The tube 204 is held in rigid alignment by means of the sleeve 212 which is secured in position by the arms 213 that are cast with the plate 214 and the sleeve 212. Also, the U-bracket 208 is cast integral with the plate 214.

The wire is located on the reel 216 and is threaded through the sleeve 205 and the tube 204, and the glass is deposited thereon as the wire passes out through the tapered end 210 of the tube 204 and to the article or core 21, where it is applied as and in the manner heretofore described. The heater 169 operates to keep the glass hot as it spreads over the tapered end 210 of the tube 204. The delivery of the glass to the wire being in close proximity to the point of application of the glass to the article or to the form for shaping the glass that may thus be delivered to the wire affords an exceedingly effective method of application of the glass or formation of the glass into glass articles, by reason of the fact that the glass does not have opportunity to cool, and the tapered end of the tube permits a regulated film-like flow of the glass onto the wire.

If desired, the article or core 21 may be driven by the shaft 218 either by hand or by means of a pulley 219 which may be connected to a suitable driving mechanism that is operable at a rate that corresponds to the regulated rate of delivery of the glass to the wire.

Figure 22:
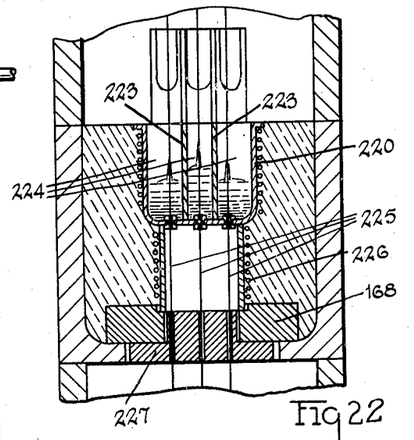
Fig. 22 illustrates a modified form of glass delivering means.

If desired, the working receptacle may be partitioned as indicated in Fig. 22, wherein the working receptacle 220 is divided by means of the partitions 223 to form three chambers 224 through which wires 225 may be drawn after having been heated by the heat element 226 which surrounds the wires. The working receptacle and the heat element 226 are supported on the block 168, and the wires pass through the block 227 which serves a similar purpose as the block 166. The wires 225 are drawn upward to the articles and, when covered with the glass, may be guided through such a guide as the water cooled guide 175 and then applied to an article or core as may be desired.

If desired, the space surrounding the receptacle 220 and the heater 226 and within the chamber in which the receptacle 220 is located may be fitted with a suitable heat insulating material.

When the form of feeder shown in Fig. 22 is used, glass of the same or different colors may be used separately, alternately or simultaneously to secure the desired decorative effect either on articles to which glass is applied or in the articles which may be formed by the deposition and integration of the turns of glass on the core.

If it is desired to apply molten glass to a beaded wire, the working receptacle 231 may be used in place of the receptacle 160 and the wire on which the beads or bugles 230 are supported may be drawn downward through a tube or shell 232 having, preferably a relatively large interior diameter to prevent contact of the glass of the beads with the heated wall of the tube. The lower end of the tube 232 is provided with a relatively small opening 233, and the lower end of the tube 232 forms an annular passageway through which the molten glass may flow onto the beads 230 and the wire that supports the beads to produce fusion of the beads and coalescence of the glass of the beads and the glass from the working receptacle. The wire is then, together with the fused glass, directed to the article, or the core, or forming mold for the application of the glass or the formation of glass articles.

I claim:

1. The method of working glass which consists in disposing glass on a wire, fusing the glass to fuse the glass to the wire to maintain a continuous fused glass strand, progressively moving the strand, shaping the strand by flexing the strand during its movement and while the glass is in a fused condition, depositing the strand upon a support having glass adherable material and bonding portions of the said strand by the glass adherable material to form from the strand an article having external dimensions different from that of the strand.

2. The method of working glass which consists in supporting fused glass of a predetermined form on a wire, moving the glass and wire, and shaping the glass during the movement while the glass is in its fused condition by flexing the glass and wire and depositing the glass and wire upon a support and locating portions of the glass in contact with a glass adherable material located on the support while the glass is in a fused condition to form from the strand an article having external dimensions different from that of the strand.

3. The method of working glass which consists in fusing glass to a wire, progressively moving the glass and wire, shaping the glass and wire by flexing the glass and the wire during the movement and depositing the glass and wire upon a support while the glass is in a fused condition and locating portions of the glass in contact with previously deposited portions of the glass to integrally unite the said portions and form a unitary article having external dimensions different from that of the strand.

4. The method of working glass which consists in forming a continuous strand of fused glass on a wire to maintain the glass on the wire united and of substantially uniform cross-section, moving the glass and wire and shaping the glass and wire during the movement and while the glass is in its fused condition by flexing the wire and glass and depositing the glass and wire on a support and locating portions of the glass in contact with glass adherable material located on the support while the glass is in a fused condition and thereby uniting the glass to glass adherable material as it is deposited.

5. A method of working glass which consists in continuously disposing molten glass on a moving wire to produce a glass strand of substantially uniform cross-sectional area, relatively moving the wire and a support having glass adherable material located thereon to produce desired directive disposition of the glass on the support and flex the wire in conformity to the shape of the support upon movement of the support and wire, one relative to the other, and bonding proximate portions of the wire-charged glass by fusion of the said portions with the said glass adherable material located on the support.

6. The method of working glass which consists in discharging molten glass on a wire to produce a stream of desired cross-sectional shape and to maintain continuity of the glass stream and connecting a portion of the wire to a support, relatively moving the support and the stream to flex the stream to cause it to conform to the shape of the support as the support and the wire are moved one relative to the other and progressively directing portions of the stream into contact with previously deposited portions of the stream to produce from the stream a glass layer on the support conforming to the configuration of the support.

7. The method of working glass which consists in supporting a strand of glass of a predetermined form on a plurality of wires, moving the glass and wires, melting the glass to fuse the glass to the wires during the movement thereof and shaping the glass during the movement and while the glass is in its molten condition, by flexing the strand and depositing it upon a support and in contact with glass adherable material thereon and thereby securing portions of the wires to the support and subsequently depositing other portions of the glass strand and wires on the support.

8. The method of working glass which consists in disposing glass on a wire, fusing the glass to fuse the glass to the wire to form a continuous strand of fused glass, progressively moving the strand, shaping the strand by flexing the strand during its movement and while the glass is in a fused condition, depositing the strand upon a support having thereon a glass adherable material in such manner that the strand substantially encloses an area, and bonding portions of the said strand by the glass adherable material to form from the strand a unitary article having external dimenions different from that of the strand.

9. An article of manufacture comprising surface fused portions of a single glass strand having a wire located within and extending lengthwise of the said strand and portions thereof, the said portions forming a space-enclosing, unitary article having dimensions other than that of the glass strand.

10. The method of working glass which consists in depositing molten glass on a plurality of wires to form a plurality of strands, flexing the strands and depositing them upon a support in such a manner that portions of each of the strands conform to the configuration of the support, and bonding the portions of the strands by surface fusion at their points of contact as the said portions are deposited to form an article having dimensions different from that of the strands.

11. The method of working glass which consists in drawing wire downwardly through molten glass to produce a glass strand and maintain continuity of the glass strand and directing the wire and the glass to a support, relatively moving the support and the strand to flex the strand to cause it to conform to the shape of the support as the support and the strand are moved, one relative to the other, to produce from the glass of the strand a glass article conforming to the configuration of the support.

12. The method of working glass which consists in drawing a wire downwardly through molten glass to produce a glass strand and moving the said wire at a rate to produce the desired cross-sectional area of the glass of the strand and directing the strand to a support having glass adherable material, relatively moving the support and the strand to flex the strand to cause it to conform to the shape of the support and produce fusion of the glass with the glass adherable material, to produce an article conforming to the configuration of the support.

13. The method of working glass which consists in drawing wire downwardly through molten glass to deposit glass on the wire, forming a cross-sectional area of the glass of the strand thus formed according to the rate of movement of the wire through the molten glass and connecting the strand to a support, relatively moving the support and the strand while holding the wire of the strand taut to flex the strand and direct the strand to desired points on the support and progressively directing portions of the strand to contact with previously deposited portions of the strand while the glass of the strand is still in a molten state to produce from the strand an integrated glass container conforming to the configuration of the support.

14. The method of working glass which consists in drawing wire downwardly through molten glass to produce a controlled molten glass stream having a cross-section according to the rate of movement of the wire through the molten glass, directing the glass stream to a support and moving the support relative to the stream to progressively direct portions of the stream into contact with previously deposited portions of the stream to produce from the glass of the stream a glass article conforming to the configuration of the support.

15. The method of working glass which consists in supporting a strand of glass of a predetermined form on a wire, moving the glass and wire, fusing the glass to fuse the glass to the wire during movement thereof and shaping the glass during the movement while in its fused condition by flexing the strand and depositing it upon a support as it is flexed and is brought into contact with portions of the strand previously deposited on the support and thereby progressively fusing the contacting portions of the strand to each other.

16. The method of working glass which consists in disposing glass on a wire, fusing the glass to fuse the glass to the wire to form a continuous strand of fused glass, progressively moving the strand, shaping the strand by flexing the strand during its movement and, while the glass is in a fused condition, depositing the strand upon a support having thereon glass adherable material, moving the support and strand one relative to the other to progressively deposit fused glass on the support and anchor the wire to the support and form within the strand an enclosed area, the portions of the strand contiguous to the previously anchored points of the wire guided by the wire in the deposition of the said contiguous portions as the strand and the support move one relative to the other.

17. The method of working glass which consists in supporting fused glass on a wire to maintain a continuity of the fused glass in strand form of substantially uniform cross-sectional area and directing the strand to a support while the glass is in a fused state and flexing the strand and depositing the strand upon the support and securing the glass and wire in position by fusion of the glass to glass located on the support as the strand is deposited on the support.

EDWARD DANNER.